Figure 1:
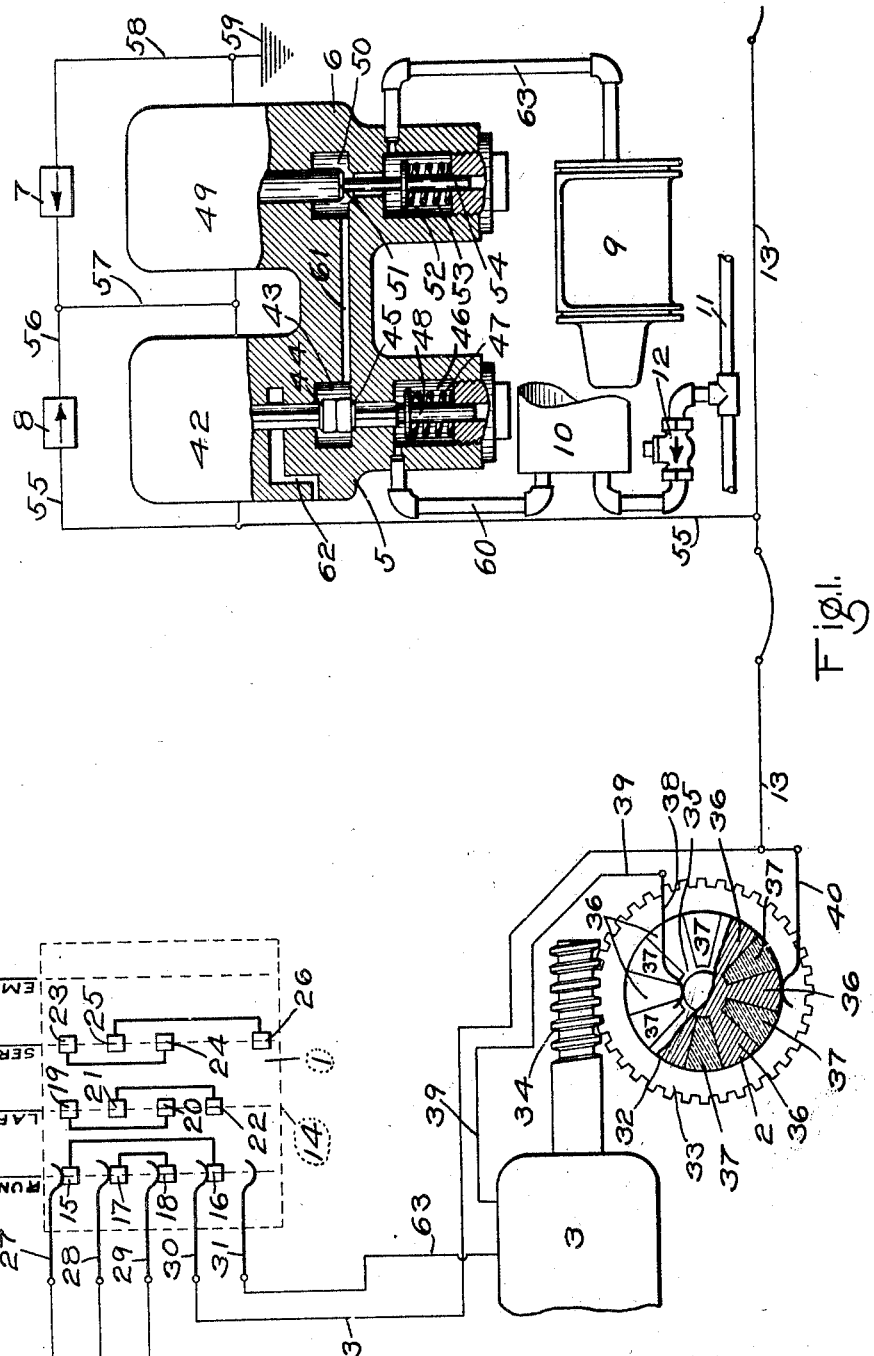

Jan. 26, 1932.  T. H. THOMAS  1,842,494
ELECTROPNEUMATIC BRAKE
Filed Nov. 10, 1928  2 Sheets-Sheet 1

INVENTOR
THOMAS H. THOMAS
BY Wm. M. Cady
ATTORNEY

Jan. 26, 1932. T. H. THOMAS 1,842,494
ELECTROPNEUMATIC BRAKE
Filed Nov. 10, 1928 2 Sheets-Sheet 2
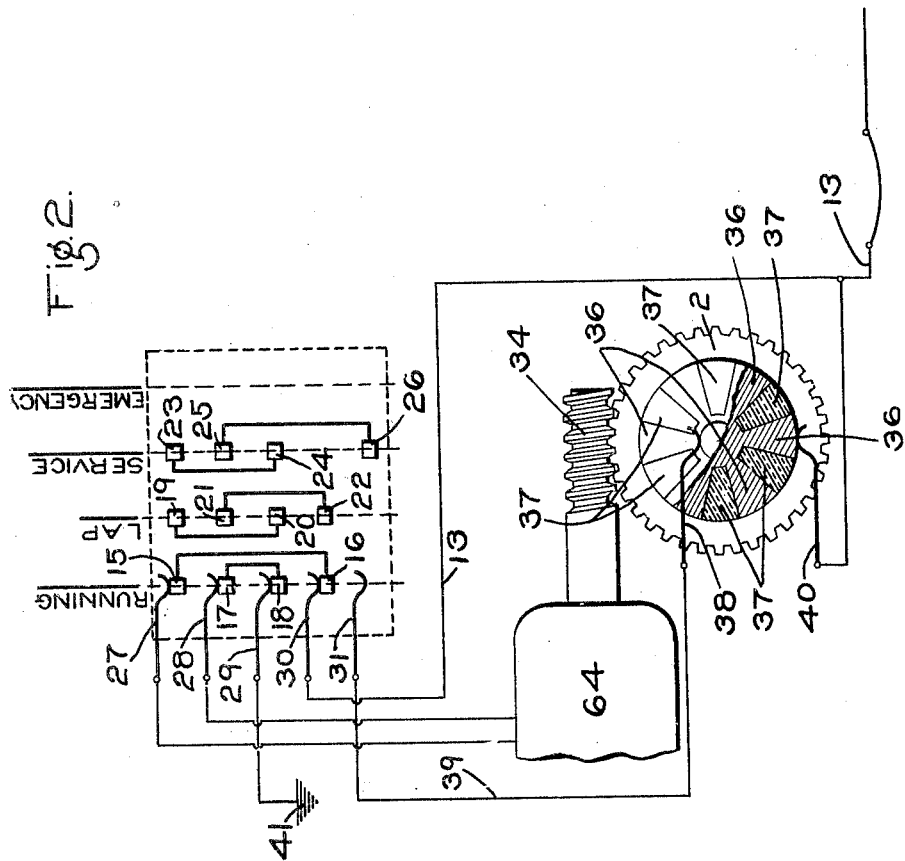
INVENTOR
THOMAS H. THOMAS
BY *Wm. M. Cady*
ATTORNEY Patented Jan. 26, 1932

1,842,494

UNITED STATES PATENT OFFICE

THOMAS H. THOMAS, OF EDGEWOOD, PENNSYLVANIA, ASSIGNOR TO THE WESTING-HOUSE AIR BRAKE COMPANY, OF WILMERDING, PENNSYLVANIA, A CORPORATION OF PENNSYLVANIA

ELECTROPNEUMATIC BRAKE

Application filed November 10, 1928. Serial No. 318,444.

This invention relates to electro-pneumatic brakes and has for its principal object to provide an improved electro-pneumatic brake system for controlling the application and release of the brakes.

Another object of my invention is to provide a fluid pressure brake system having novel means for effecting an application of the brakes at a slow rate.

A further object of my invention is to provide an electro-pneumatic brake system having electrically controlled means for effecting a service application of the brakes at a slower rate than an emergency application of the brakes is effected.

Other objects and advantages will appear from the following more detailed description of the invention.

In the accompanying drawings; Fig. 1 is a diagrammatic view, partly in section, of an electro-pneumatic brake system embodying my invention, as applied to a locomotive and one car; and Fig. 2 is a diagrammatic view, partly in section, of a modification of the invention, the locomotive equipment only being shown.

As shown in the drawings, the locomotive or head vehicle of a train is provided with a brake switch device 1, an electric current interrupter 2, a motor 3 or any other means for driving the interrupter 2, and a battery 4 or any other desired source of electric current.

Each car of the train may be provided with a release magnet valve device 5, an application magnet valve device 6, two rectifiers, 7 and 8, adapted to permit the flow of current in only one direction, a brake cylinder 9, an auxiliary reservoir 10, a fluid pressure supply pipe 11 which is connected to the auxiliary reservoir 10 through a check valve 12, and a train wire 13.

The fluid pressure supply pipe 11 and the train wire 13 on each car are adapted to be connected between adjoining cars, so as to form a continuous supply pipe line and electric train wire, throughout the train.

The brake switch device 1 on the locomotive has been illustrated diagrammatically and may comprise a rotatable drum 14 on which are mounted connected contacts 15 and 16, 17 and 18, 19 and 20, 21 and 22, 23 and 24, and 25 and 26, which are adapted to contact with terminal contacts 27, 28, 29, 30 and 31.

The current interrupter 2 may comprise a rotatable drum 32 which is adapted to be driven by the motor 3 through the medium of a worm gearing comprising a toothed wheel 33 carried by the drum and a worm gear 34 carried by the shaft of the motor. The drum 32 is of composite construction comprising a metal core 35 having a plurality of spaced radially arranged contacts 36 between which are mounted sections 37 of insulating material.

Constantly contacting with the core 35 of the interrupter drum 32, is a contact finger 38 which is connected to the contact 31 of the brake switch device 1, through a wire 39, motor 3 and a wire 63. The periphery of the drum is constantly engaged by a contact finger 40 which is connected to the train wire 13 connected to the contact 30 of the brake switch device. As the drum 32 is rotated, the contact finger 40 will alternately contact with the contacts 36 and insulating sections 37 thus interrupting the flow of a current through the core 35 as will hereinafter more fully appear.

The terminal contacts 27 and 28 of the brake switch device 1 are connected to the negative and positive terminals respectively of the battery 4, and the terminal contact 29 is connected to ground at 41.

The release magnet valve device 5 comprises a magnet 42 and a casing having a chamber 43 containing double beat valves 44 and 45 adapted to be operated by said magnet, and a chamber 46 containing a coil spring 47 adapted to engage a collared stem 48 secured to the valve 45.

The application magnet valve device 6 comprises a magnet 49 and a casing having a chamber 50 containing a valve 51, adapted to be operated by said magnet, and a chamber 52 containing a coil spring 53, adapted to engage a collared stem 54 carried by the valve 51.

The rectifiers 7 and 8 are disposed in shunt circuits around the magnets 49 and 42 respectively, and are adapted to permit the flow of electric current only in one direction, as indicated by the arrow on each rectifier. The resistance of each shunt circuit, including the rectifier, is so small in comparison to the resistance of the magnet around which said shunt circuit is made, that substantially all the current flows through the rectifier, and the small amount of current that flows through the magnet is insufficient to operate said magnet. For example, the current flowing from the train wire 13 to a wire 55, flows through the rectifier 8 and is prevented, by the rectifier 7, from flowing through the shunt circuit around the magnet 49. Said current therefore flows through wires 56 and 57 and magnet 49 to a wire 58 connected to ground at 59. The small amount of current that flows through the magnet 42, in this instance, is insufficient to operate said magnet. In the same manner, when current is flowing in the reverse direction, the magnet 42 is energized while the magnet 49 remains substantially deenergized.

In operation, assuming the fluid pressure supply pipe 11 charged with fluid under pressure, fluid under pressure is supplied from said pipe to the auxiliary reservoir 10 through the check valve 12, charging said reservoir.

With the brake switch device 1 in running position as shown in the drawings, the contacts 15, 17, 18 and 16 contact with the terminal contacts 27, 28, 29 and 30 respectively, thus the electric current supplied by the battery 4, flows from the positive terminal of said battery to the ground 41 on the locomotive by way of terminal contact 28, contacts 17 and 18 and terminal contact 29. From the ground 41 the current flows to the ground 59 on the car, thence through wire 58, rectifier 7, wires 56 and 57, magnet 42 and through wires 55 and 13, contact terminal 30, contacts 16 and 15 of the brake switch device 1, and contact terminal 27 to the negative terminal of the battery, thus energizing the release magnet 42.

The magnet 42, being energized, holds the valve 45 seated and the valve 44 unseated. With the valve 45 seated, fluid under pressure from the chamber 46 which is connected to the reservoir 10, by a pipe 60 is prevented from flowing to the valve chamber 43, and with the valve 44 unseated, the valve chamber 43, connected to a passage 61, is vented by way of a passage 62, to the atmosphere.

When the current in the train wire 13 flows in the direction described above, insufficient current flows through the application magnet 49 to cause it to operate the valve 51 and the valve is held unseated by the pressure of the spring 53, so that the brake cylinder 9 is vented to atmosphere by way of a pipe 63, spring chamber 52 in the application magnet valve device 6, past the unseated valve 51, through valve chamber 50, passage 61, valve chamber 43 of the release magnet valve device 5, past the unseated valve 44 and through atmospheric passage 62.

To effect an application of the brakes, the brake switch device 1 is operated to service position in which the negative terminal of the battery 4 is connected to ground 41 through the contact terminal 27, connected contacts 23 and 24 on the drum 14 of the switch device and contact terminal 29. With the negative terminal of the battery 4 thus grounded, current flows from the positive terminal through contact terminal 28, connected contacts 25 and 26 on the drum 14 of the brake switch device, contact terminal 31, wire 63, motor 3, wire 39, contact finger 38 to the core 35 of the interrupter. Current flowing through the motor 3 causes said motor to operate to drive the interrupter 2. Now as the interrupter drum 32 is rotated, the contacts 36 of the core 35 and the insulating sections will be alternately engaged by the contact finger 40. With any one of the contacts 36 in contact with the contact finger current from the contact 36 flows through the contact finger 40, train wire 13, wire 55, rectifier 8, wires 56 and 57, application magnet 49 to ground 59 on the car and then through ground to the negative terminal of the battery 4, thus energizing the magnet 49.

It will here be noted that when the brake switch device 1 is operated from running position to service position, the circuit through the release magnet 42 is open thus deenergizing said release magnet. With the magnet 42 deenergized, the pressure of the spring 47, acting on the collared stem 48 of the valve 45, causes the valve 44 to be seated closing communication of the valve chamber 43 with atmosphere, and also causes the valve 45 to be unseated, establishing communication of the spring chamber 46 with the valve chamber 43, passage 61 and valve chamber 50 in the application magnet valve device 6.

The magnet 49 being energized as above described, causes the valve 51 to seat against the pressure of the spring 53 thus closing communication of the valve chamber 50 with the chamber 52 and brake cylinder 9.

With any one of the insulating sections 37 of the drum 32 in contact with the contact finger 40 the circuit through the interrupter drum is opened which results in the deenergization of the magnet 49 of the application magnet valve device 6. With the magnet 49 deenergized the pressure of the spring 53 causes the valve 51 to be unseated so that fluid under pressure from the reservoir 10 flows to the brake cylinder 9 by way of pipe 60, spring chamber 46 of the release magnet valve device 5, past the unseated valve 45, through passage 61 and valve chamber 50 of the application magnet valve device 6, past the unseated valve 51 into chamber 52 and from thence through pipe 63.

Since, by the rotation of the drum 32 of the interrupter, the circuit through the magnet 49, when the brake switch device 1 is in service position, is alternately opened and closed causing the alternate seating and unseating of the valve 51, the flow of fluid under pressure flowing to the brake cylinder 9 is interrupted each time the valve 51 seats, and due to this the build up in brake cylinder pressure, in effecting a service application of the brakes, will be at a slow rate, which rate may be governed by the relative widths of the contact faces of the contacts 36 and insulating sections 37. Each time the valve 51 is unseated in effecting a service application of the brakes, fluid under pressure will flow to the brake cylinder until the brake cylinder pressure equals that in the auxiliary reservoir.

If, however, it is desired to limit the brake cylinder pressure to some degree less than the equalization pressure, or to graduate the application of the brakes, when the desired pressure is attained in the brake cylinder, the operator operates the brake switch device 1 from service position to lap position in which the negative terminal of the battery 4 is connected to ground 41 by way of contact terminal 27, connected contacts 19 and 20 of the switch device 1 and contact terminal 29, and in which the positive terminal of the battery 4 is connected to the train wire 13 by way of contact terminal 28 connected contacts 21 and 22 of the brake switch device, and contact terminal 30. The battery current now flows from the positive terminal of the battery to the train wire and from thence through wire 55, rectifier 8, wires 56 and 57, application magnet 49 and wire 58 to ground 59 on the car and from thence through the ground to ground 41 on the locomotive and then to the negative terminal of the battery, thus energizing the magnet 49 which causes the valve 51 to seat and close off the further supply of fluid under pressure from the auxiliary reservoir 10 to the brake cylinder 9.

So long as the brake switch device 1 is maintained in lap position the magnet 49 will be maintained energized.

When the brake switch device 1 is in lap position, the magnet 42 is deenergized so that the valve 44 is maintained seated and the valve 45 unseated. However, the positions of these valves is immaterial at this particular time.

By alternately operating the brake switch device 1 to service and lap positions, so as to alternately deenergize and energize the magnet 49, the brake cylinder pressure may be increased in steps up to the degree at which the auxiliary reservoir 10 equalizes into the brake cylinder.

To release the brakes, the brake switch device 1 is operated to running position in which the release magnet 42 is energized, causing the valve 44 to be unseated and the valve 45 to be seated, and the magnet 49 is deenergized so that the valve 51 is unseated. Thus the brake cylinder 9 is connected to the atmosphere and the release of fluid under pressure in the brake cylinder is effected.

If it is desired to graduate the release of the brakes, the brake switch device 1 is operated from running position to lap position, causing the magnet 49 to be energized, and operates to seat the valve 51 so as to prevent further flow of fluid under pressure from the brake cylinder 9 to the atmosphere. By alternately operating the brake switch device from runing position to lap position, the brake cylinder pressure may be reduced in steps as desired.

In graduating the release of the brakes the valve 44 is seated and the valve 45 is unseated by the deenergization of the magnet 42 when the valve 51 is seated, but the operation of these valves at this time has no effect upon the brake operation.

To effect an emergency application of the brakes, the brake switch device 1 is operated to emergency position in which the circuits to both the release and application magnets 42 and 49 respectively are opened deenergizing the magnets. The deenergization of the magnet 49 permits the valve 51 to be unseated and the deenergization of the magnet 42 permits the valve 44 to be seated and the valve 45 to be unseated, thus fluid under pressure is supplied from the reservoir 10 to the brake cylinder effecting an emergency application of the brakes.

It will be noted that an application of the brakes will be effected upon the deenergization of both magnets. This is very desirable, since in case the train wire 13 becomes broken, or if the current should fail from any cause, an application of the brakes will be automatically effected and the train brought to a stop. The brakes cannot then be released and the train started until the circuit has been repaired or the current supply restored.

The check valve 12 is placed in the pipe connecting the fluid pressure supply pipe 11 to the auxiliary reservoir 10, so that in case of the rupture of said pipe, as would occur in the event of a train breaking in two, a supply of fluid under pressure is retained on the car to apply the brakes.

As shown in Fig. 1 of the drawings, the motor 3 operates to drive the drum 32 of the interrupter 2 only when the brake switch device 1 is in service position since it is in this position only that an electric circuit is completed through the motor.

In Fig. 2 of the drawings, a modification of the invention is illustrated, in which, the battery 4 is omitted and a turbo-generator 64 is used instead to supply electric current for operating the brake equipment. In this modification the worm gear 34 is secured to the shaft of the generator 64 and is adapted to drive the drum 32 of the interrupter as described. Since the turbo-generator 64 supplies the electric current for the operation of the brake equipment, it must operate constantly while the locomotive is in use, consequently the drum 32 will be rotated constantly, regardless of the position of the brake switch device 1, but will be effective in controlling the flow of current through the application magnet 49 only when the brake switch device is in service position. When the generator 64 is used instead of the battery 4, one terminal of the generator is connected to the terminal contact 27 of the brake switch device 1 and the other terminal is connected to the contact terminal 28, and the wire 39 directly connects the contact terminal 31 of the brake switch device to the contact finger 38 of the interrupter 2. Aside from the differences noted the remainder of the equipment may be the same as that described in connection with the use of the battery 4 and motor 3.

In the drawings I have shown the faces of the contacts 36 and of the insulating sections 37 of the interrupter drum 32 of substantially the same width so that the time that the valve 51 of the application magnet valve device 6 remains seated and the time that it remains unseated will be equal, but I wish it to be understood that if desired the faces of the contacts 36 may be made of greater width than the faces of the insulating sections 37 which would cause the valve 51 to remain seated for a longer period of time than it would remain unseated. If it should be desired to have the valve 51 remain unseated for a longer period of time than it is seated, the width of the faces of the contacts 36 may be made less than the width of the faces of the insulating sections 37. It will thus be seen that the rate of build up in brake cylinder pressure may be governed by the relative widths of the faces of the contacts 36 and insulating sections 37.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake, the combination with a brake cylinder, of a plurality of electrically controlled valves for supplying fluid under pressure to said brake cylinder to effect an application of the brakes, and mechanically driven means for causing one of said valves to operate to periodically interrupt the flow of fluid under pressure to the brake cylinder in effecting said application of the brakes.

2. In a fluid pressure brake, the combination with a brake cylinder, of a plurality of electrically controlled valves for supplying fluid under pressure to said brake cylinder to effect an application of the brakes, and electrical means comprising a rotatable member operating for causing one of said valves to operate to periodically interrupt the flow of fluid under pressure to the brake cylinder in effecting said application of the brakes.

3. In a fluid pressure brake, the combination with a brake cylinder, of an electrically controlled device operative to alternately supply and close off the supply of fluid under pressure to the brake cylinder to effect an application of the brakes, electrically controlled valve means for supplying fluid under pressure to said device to be supplied to the brake cylinder, and means comprising a rotatable member operative to control the operation of said electrically controlled device and valve means.

4. In a fluid pressure brake, the combination with a brake cylinder, of a plurality of electrically controlled valve devices operative to supply fluid under pressure to the brake cylinder to effect an application of the brakes, a train wire through which current is supplied to one of said devices, and mechanically driven means for periodically interrupting the flow of current through said wire to cause the last mentioned valve device to operate to intermittently supply fluid under pressure to the brake cylinder in effecting said application of the brakes.

5. In an electro-pneumatic brake, the combination with a brake cylinder, of electrically controlled valve means operative upon deenergization to supply fluid under pressure to the brake cylinder to effect an application of the brakes and operative upon energization to close off the supply of fluid under pressure to the brake cylinder and mechanically driven means operative to alternately deenergize and energize said electrically controlled valve means in effecting an application of the brakes.

6. In an electro-pneumatic brake, the combination with a brake cylinder, of electrically controlled valve means operative upon deenergization to supply fluid under pressure to the brake cylinder to effect an application of the brakes and operative upon energization to close off the supply of fluid under pressure to the brake cylinder, and means comprising a rotatable element operative to alternately deenergize and energize said electrically controlled valve means to interrupt the flow of fluid under pressure to the brake cylinder in effecting an application of the brakes.

7. In an electro-pneumatic brake, the combination with a brake cylinder, of electrically controlled valve means operative upon deenergization to supply fluid under pressure to the brake cylinder to effect an application of the brakes and operative upon energization to close off the supply of fluid under pressure to the brake cylinder, an electric circuit through which current is supplied to said electrically controlled valve means, and a mechanism comprising a rotatable element operative to periodically open and close said circuit to cause said valve to operate to intermittently supply fluid under pressure to said brake cylinder in effecting an application of the brakes.

8. In an electro-pneumatic brake, the combination with a brake cylinder, of electrically controlled valve means operative upon deenergization to supply fluid under pressure to the brake cylinder to effect an application of the brakes and operative upon energization to close off the supply of fluid under pressure to the brake cylinder, an electric circuit through which current is supplied to said electrically controlled valve means, a manually operative switch device for closing said circuit and a mechanism comprising a rotatable element operative to open and close said circuit periodically to control the operation of said electrically controlled valve means to effect an application of the brakes.

9. In an electro-pneumatic brake, the combination with a brake cylinder, of electrically controlled valve means operative upon deenergization to supply fluid under pressure to the brake cylinder to effect an application of the brakes and operative upon energization to close off the supply of fluid under pressure to the brake cylinder, a train wire through which current is adapted to be supplied to said electrically controlled valve means, a source of current, an electric current interrupter having one terminal connected to said train wire and comprising a rotatable drum, a brake switch device operative to a position to connect the source of current through said interrupter to said train wire, said drum being operative to interrupt the flow of current through said electrically controlled valve means to cause said means to operate to intermittently close off the supply of fluid under pressure to the brake cylinder in effecting an application of the brakes.

10. In an electro-pneumatic brake, the combination with a brake cylinder, of electrically controlled valve means for controlling the supply and release of fluid under pressure to and from the brake cylinder, an electrically controlled valve device for controlling communication through which said valve means supplies fluid under pressure to the brake cylinder and mechanically driven means for controlling the operation of said valve device to intermittently supply fluid under pressure to the brake cylinder in effecting an application of the brakes.

11. In an electro-pneumatic brake, the combination with a brake cylinder, of electrically controlled valve means for controlling the supply and release of fluid under pressure to and from the brake cylinder, electrically controlled valve means for controlling communication through which the first mentioned valve means supplies fluid under pressure to the brake cylinder, a single train wire through which current is supplied to operate both electrically controlled valve means, and rotatable means adapted when rotated to periodically interrupt the flow of current through the first mentioned valve means to cause the first mentioned valve means to alternately supply and close off the supply of fluid under pressure to the brake cylinder in effecting an application of the brakes.

12. In an electro-pneumatic brake, the combination with two electrically controlled devices for controlling the application and release of the brakes and a single train wire through which current is adapted to be supplied to both devices, of means for preventing the effective energization of one device when the other is energized by the flow of current through said wire, and means adapted to be cut into circuit with said train wire and comprising a rotatable member operative to periodically interrupt the flow of current through one of said devices to cause it to operate to retard the rate of a brake application.

13. In an electro-pneumatic brake, the combination with two electrically controlled devices for controlling the application and release of the brakes and a single train wire through which current is adapted to be supplied to both devices, of means for preventing the effective energization of one device when the other is energized by the flow of current through said wire, and means adapted to be cut into circuit with said train wire and comprising an electric motor driven member operative to periodically interrupt the flow of current through one of said devices to cause it to operate to retard by steps the rate of a brake application.

14. In an electro-pneumatic brake, the combination with a train wire, of means for effecting the release of the brakes when current is flowing through said wire in one direction, for holding the brakes applied when current is flowing at one time through said wire in the reverse direction, for effecting an application of the brakes in stages at another time when the current is flowing in said reverse direction and for applying the brakes when no current is flowing through said wire, said means comprising a member rotatable for controlling the application of the brakes in stages.

15. In an electro-pneumatic brake, the combination with a train wire, of means for effecting the release of the brakes when current is flowing through said wire in one direction, for holding the brakes applied when current is flowing at one time through said wire in the reverse direction, for effecting an application of the brakes in stages at another time when the current is flowing in said reverse direction and for applying the brakes when no current is flowing through said wire, and means for controlling the flow of current, said means comprising a member rotatable for controlling the application of the brakes in stages.

16. In an electro-pneumatic brake, the combination with a train wire, of means for effecting the release of the brakes when current is flowing through said wire in one direction, for holding the brakes applied when current is flowing at one time through said wire in the reverse direction, for effecting an application of the brakes in stages at another time when the current is flowing in said reverse direction and for applying the brakes when no current is flowing through said wire, and a manually operative switch device for controlling the flow of current, said means comprising a member rotatable for controlling the application of the brakes in stages.

17. In an electro-pneumatic brake, the combination with a train wire, of means for effecting the release of the brakes when current is flowing through said wire in one direction, for holding the brakes applied when current is flowing at one time through said wire in the reverse direction, for effecting an application of the brakes in stages at another time when the current is flowing in said reverse direction and for applying the brakes when no current is flowing through said wire, said means comprising a member rotatable for periodically interrupting the flow of current through said train wire in effecting the application of the brakes in stages.

18. In an electro-pneumatic brake, the combination with two electro-magnets, of means operative upon the deenergization of both of said electro-magnets for effecting an emergency application of the brakes, and operative upon the deenergization of one of said electro-magnets and alternate energization and deenergization of the other of said electro-magnets for effecting a service application of the brakes, and mechanically driven means for automatically controlling the alternate deenergization and energization of the last mentioned electro-magnet.

19. In an electro-pneumatic brake, the combination with two electro-magnets, of means operative upon the deenergization of both of said electro-magnets for effecting an emergency application of the brakes, and operative upon the deenergization of one of said electro-magnets and alternate energization and deenergization of the other of said electro-magnets to effect a service application of the brakes, and mechanically driven means operative automatically for intermittently deenergizing the last mentioned electro-magnet.

20. In an electro-pneumatic brake, the combination with a brake cylinder and a plurality of electrically controlled valve devices for supplying fluid to the brake cylinder to effect either a service or an emergency application of the brakes, of mechanically driven means for causing one of said valve devices to operate to supply fluid to the brake cylinder at a slower rate in a service application than in an emergency application of the brakes.

21. In an electro-pneumatic brake, the combination with a brake cylinder and a plurality of electrically controlled valve devices for supplying fluid to the brake cylinder to effect either a service or an emergency application of the brakes, of means having a service application position and an emergency application position in which said valve devices are adapted to supply fluid under pressure to the brake cylinder, and means comprising a rotatable member for controlling the operation of one of said valve devices to supply fluid to the brake cylinder at a slower rate in a service than an emergency application of the brakes.

22. In an electro-pneumatic brake, the combination with a brake cylinder and a plurality of electrically controlled valve devices for supplying fluid to the brake cylinder to effect either a service or an emergency application of the brakes, of means having a service application position and an emergency application position in which said valve devices are adapted to supply fluid under pressure to the brake cylinder, and means comprising a rotatable member operative when the first mentioned means is in service position for causing one of said valve devices to operate to supply fluid to the brake cylinder at a slower rate than it is supplied in an emergency application of the brakes.

23. In an electro-pneumatic brake, the combination with a brake cylinder and a plurality of electrically controlled valve devices for supplying fluid to the brake cylinder to effect either a service or an emergency application of the brakes, of means having a service application position and an emergency application position in which said valve devices are adapted to supply fluid under pressure to the brake cylinder, and means in circuit with one of said electrically controlled valve devices when the first mentioned means is in service position and comprising a rotatable member operative for controlling the operation of the last mentioned valve device to supply fluid under pressure to the brake cylinder at a slower rate than in an emergency application of the brakes.

24. In an electro-pneumatic brake, the combination with a brake cylinder and a plurality of electrically controlled valve devices for supplying fluid to the brake cylinder to effect either a service or an emergency application of the brakes, of means having a service application position and an emergency application position in whch said valve is adapted to supply fluid under pressure to the brake cylinder, and means in circuit with one of said electrically controlled valve devices and comprising a rotatable member operative to alternately open and close the circuit through the last mentioned electrically controlled valve device when the first mentioned means is in service position for causing the last mentioned valve device to operate to supply fluid to the brake cylinder at a slower rate in a service application than in an emergency application of the brakes.

25. In a fluid pressure brake, the combination with a brake cylinder, and a plurality of valve devices for supplying fluid to the brake cylinder to effect either a service or an emergency application of the brakes, of means comprising a rotatable member operative for causing one of said valve devices to operate to supply fluid to the brake cylinder at a slower rate in a service application than in an emergency application of the brakes.

26. In a fluid pressure brake, the combination with a brake cylinder and a plurality of valve devices for supplying fluid to the brake cylinder to effect either a service or an emergency application of the brakes, of means having a service application position and an emergency application position in which one of said valve devices is adapted to supply fluid under pressure to the brake cylinder, and means comprising a rotatable member operative when the first mentioned means is in service application position for controlling the operation of the last mentioned valve device to supply fluid to the brake cylinder at a slower rate than in an emergency application of the brakes.

In testimony whereof I have hereunto set my hand, this 8th day of November, 1928.

THOMAS H. THOMAS.